Patented Jan. 7, 1941

2,227,813

UNITED STATES PATENT OFFICE 2,227,813

TREATING CANDY SCRAP

Albert C. Roland, New York, N. Y., assignor to Applied Sugar Laboratories, Inc., New York, N. Y., a corporation of New York No Drawing. Application April 27, 1939,
Serial No. 270,339

8 Claims. (Cl. 127—46)

In the process of manufacturing candy and in the candy business in general, considerable so-called scrap candy is produced. This excess may rise in the manufacturing process and also in connection with the handling and packing of the finished product, for example, in the manufacturing of hard candies of a composite nature the excess of certain components frequently represents scrap and in the manufacture of soft candies the scrap may be produced in the molding, forming, shaping and cutting, thereof. In the candy business the candies sold by the manufacturer to wholesalers and retailers are often returned unsold, which material is a total loss to the manufacturer unless it can be properly reclaimed and is consequently designated in the trade as "scrap."

Frequently candy scrap is highly colored and the source of the color is not only a component, as caramel and the like, but also coloring materials such as vegetable and synthetic dye-stuffs, which are difficult to destroy or decolorize. In the case of highly colored scrap it can be remelted, but the syrup produced thereby can be utilized as such only in connection with the preparation of candy of the same nature or composition as the scrap, and such disposal of scrap is necessarily of a limited nature. This is so not only because of the color of the scrap but also of the flavor. Moreover, frequently it is difficult or impossible to utilize the scrap in this manner at all because it may represent an aggregate or conglomeration of a number of flavors and can be reworked only in the event that the flavoring added to the mass into which it is worked is sufficiently strong to mask the non-descript flavor of the scrap mixture.

Consequently, for many years, there has been a demand for some method of satisfactorily removing color and flavor from scrap so as to produce a decolorized and deflavored syrup which could be universally used by the manufacturer for any desired purpose. Attempts have been made to supply this demand, but so far as known they have fallen far short of satisfaction because of failure satisfactorily to remove color and flavor.

It is an object of the present invention to supply this long existent demand by providing a process which enables the manufacturer of candy or other sacchariferous materials to economically remove color and flavor from scrap material to any desired extent.

In order to provide a specific illustration for the principle of the present invention, the following example is submitted:

670 kilograms of scrap candy are dissolved in 330 kilograms of water and the resulting syrup is heated to a temperature of 140° F., at which point 4 kilograms (0.6%) of calcium hydroxide and 0.5 kilogram (0.075%) monocalcium phosphate are added and the mixture is agitated vigorously for 15 minutes. The temperature is then raised to 180° F. and maintained at that point for about 15 minutes, after which a filter aid (e. g. 0.5% diatomaceous earth) is added and the solution is filtered. The filtrate is cooled to room temperature or about 77° F. and is treated with 0.670 kilogram (0.1%) of calcium hypochlorite and 0.335 kilogram (0.05%) of monocalcium phosphate for about 15 minutes.

To the mixture 6.7 kilograms of activated, finely divided carbon is added and the solution is heated to about 160° F. while being agitated at this temperature for about 45 minutes, in order to remove traces of chlorine, after which it is filtered.

The resulting solution has a color unit of about 6.5 at 5000 Angstrom, extinction 1000. The original solution had 215 color units, therefore the percentage color removed was approximately 97%. The color of the original solution was due to the presence of caramelization of the carbohydrates plus added aniline and vegetable colors. The resulting product was not only substantially water-white but was also substantially free from flavor, whereas the original product was of a typical hard candy flavor with essential oil flavors.

According to the present invention, the solution of scrap is first subjected to a defecation treatment, which is then followed by a bleaching treatment, as, for example, one employing an alkaline hypochlorite and preferably a substance for use in conjunction with the hypochlorite, sufficient to metathesize the hypochlorite, release hypochlorous acid and produce the substantially complete precipitation of all anions and cations of the hypochlorite and of the metathesizing substance except those necessary to form hypochlorous acid. Such a metathesizing substance is illustrated by calcium monophosphate.

Instead of employing lime and phosphates or phosphoric acid as the defecant other defecants may be used, but in all cases the bleaching treatment occurs subsequent to the defecation.

In some cases it may be necessary to employ a treatment with activated carbon prior to the bleaching step and subsequent to the defecation.

Such a procedure may be followed by employing about 0.5% of finely divided activated carbon following the initial defecation step.

The process is not limited to any particular type of candies but includes scrap from the manufacture of the following: hard candies, boiled sweets, fondant wafers, bonbon coating, crystalized creams, crystalizing syrups, etc.

The preferred defecation treatment consists in adding to the crude syrup (made from the scrap) reagents which will react and thereby precipitate an insoluble finely divided precipitate in situ without forming any soluble salt by-products. For example, the already mentioned lime or calcium hydroxide may be added, followed by phosphoric acid or an acid phosphate of calcium.

This treatment is then followed (but not preceded) by a bleaching treatment and there it is advantageous to employ reagents which will generate a nascent bleaching agent, e. g. HClO without forming any soluble by-products. Instead of hypochlorous acid, other halogen bleaching agents may be used.

Other defecants and other bleaching agents may be employed, but I have obtained the best results with a phosphate defecation followed by a bleaching treatment with hypochlorous acid.

In any event, the bleaching treatment should be applied to the syrup only after it has been defecated. This is not the equivalent of treatment in the reverse order. There is a definite and special cooperation between a bleaching treatment and a defecation treatment when the latter precedes the bleaching.

I claim:

1. The process of reclaiming candy scrap which comprises dissolving said scrap in water to make a syrup, subjecting said syrup to defecation and treating the defecated syrup with a hypochlorite bleaching agent.

2. The process of reclaiming candy scrap which comprises dissolving said scrap in water to make a syrup, treating said syrup with an alkaline earth hydroxide and a precipitant for the alkaline earth metal in said hydroxide at a temperature of approximately 180° F., filtering the resulting mixture, treating the resulting syrup with a calcium hypochlorite bleaching agent at approximately room temperature, treating the resulting mixture with about 1 per cent of activated carbon at a temperature of about 160° F. to remove excess chlorine and then filtering the mixture.

3. The process which comprises treating a syrup made by dissolving candy scrap in water with reagents which cause the precipitation of a finely divided precipitate in situ, filtering the mixture, and treating the filtrate syrup with a halogen bleaching agent.

4. The process which comprises defecating a syrup made by dissolving in water candy scrap containing coloring and flavoring ingredients added to the candy (from which said scrap was obtained) during the process of making said candy, and treating said defecated syrup with hypochlorous acid, generated in said syrup in situ.

5. The process of treating candy scrap containing both coloring and flavoring material to produce a decolorized and deflavored syrup, which comprises dissolving said scrap in water, treating said syrup with an alkaline earth hydroxide and a precipitant for the alkaline earth metal in said hydroxide and thereby defecating said syrup and thereafter treating the defecated syrup with calcium hypochlorite and monocalcium phosphate whereby said previously defecated syrup is subjected to the action of hypochlorous acid and is thereby decolorized and deflavored.

6. The process of treating candy scrap containing coloring and flavoring material which comprises dissolving said scrap in water to make a syrup, treating said syrup with an alkaline earth hydroxide and a precipitant for the alkaline earth metal in said hydroxide whereby said syrup is defecated, and thereafter subjecting the defecated syrup to the action of a hypochlorite, whereby said coloring and flavoring materials are substantially destroyed.

7. The process of treating candy scrap containing coloring and flavoring material which comprises dissolving said scrap in water to make a syrup, heating the resulting syrup to a temperature of about 140° F., adding calcium hydroxide and monocalcium phosphate, agitating the mixture, raising the temperature to about 180° F., adding diatomaceous earth, filtering the solution, cooling the filtrate, adding to the cooled filtrate calcium hypochlorite and monocalcium phosphate, thereafter adding finely divided carbon and heating to about 160° F. and finally filtering the resulting reaction mixture, whereby a decolorized and deflavored syrup is produced.

8. The process of removing color and flavor from candy scrap containing coloring and flavoring material which comprises dissolving said scrap in water to make a syrup and treating said syrup with a defecant, a hypochlorite bleaching agent and finely divided activated carbon in the order named, whereby a decolorized and deflavored syrup is obtained.

ALBERT C. ROLAND.